United States Patent [19]

Marosko

[11] 4,027,286
[45] May 31, 1977

[54] MULTIPLEXED DATA MONITORING SYSTEM

[75] Inventor: Ronald Jon Marosko, Houston, Tex.

[73] Assignee: TRW Inc., Redondo Beach, Calif.

[22] Filed: Apr. 23, 1976

[21] Appl. No.: 679,608

[52] U.S. Cl. .................. 340/171 R; 340/310 R; 340/408

[51] Int. Cl.² ............... G08B 21/00; H04Q 9/00

[58] Field of Search .......... 340/147 R, 171 R, 170, 340/152 T, 151, 310 R, 310 A, 416, 408, 409, 171 A; 178/51, 66; 343/200

[56] References Cited

UNITED STATES PATENTS

| | | | |
|---|---|---|---|
| 3,461,428 | 8/1969 | Anderson | 340/147 R |
| 3,550,090 | 12/1970 | Baker, Jr. et al. | 340/171 R |
| 3,551,890 | 12/1970 | Silverman | 340/171 R |
| 3,719,928 | 3/1973 | Oishi et al. | 340/171 R X |
| 3,732,562 | 5/1973 | Faber et al. | 340/408 |
| 3,766,540 | 10/1973 | Schopfer et al. | 340/171 A X |
| 3,895,369 | 7/1975 | Ono et al. | 340/310 R |
| 3,938,129 | 2/1976 | Smither | 340/170 X |

Primary Examiner—Donald J. Yusko
Attorney, Agent, or Firm—J. J. Connors; J. A. Dinardo; E. A. Oser

[57] ABSTRACT

A multiplexed data monitoring system for use in monitoring the status of control valves or the like in subsea petroleum well control systems, utilizes an encoder circuit located externally of the control module and composed of passive electrical components, such as inductors and capacitors, to encode switch contact closure or status information into discrete frequency data. The external encoder circuit is coupled by a pair of wires to the control module.

The decoder circuitry within the subsea control module applies an alternating current signal of varying frequency to the encoder circuit and by monitoring the phase of the alternating current, the decoder circuitry can recover the data impressed by the switch contacts at the status points, which are also located externally of the control module.

14 Claims, 7 Drawing Figures

MULTIPLEXED DATA MONITORING SYSTEM

BACKGROUND OF THE INVENTION

This invention relates to improvements in monitoring the status of remotely located apparatus, and particularly to such a system employing electronic means for monitoring the status of a multiplicity of data points with a minimum of interconnections.

In subsea petroleum well control systems, as well as other similar type systems, the status of valves or other devices need to be known for proper operation of the system. Generally, these status points are remotely located from the basic control module and transferring this data into the module requires an electrical interface.

In some subsea control modules, it has been found desirable to perform electrical interface by means of inductive couplers, whose numbers are limited due to size restrictions in the flange connecting a control module to the well structure. The number of desired status readings sometimes greatly exceed the number of couplers available so that each coupler must handle a number of status points.

It would be possible to employ small external modules to process this information and transfer it to the control module, but this would unduly increase the complexity of the system as well as require power for handling the active devices in such a module. It would be desirable to handle the required data as simply as possible with a high degree of reliability.

SUMMARY OF THE INVENTION

A method and apparatus is disclosed for determining the respective states of a plurality of devices having at least two stable states. According to a preferred embodiment, the apparatus comprises a passive encoder including a plurality of resonant networks equal in number to the number of devices, and each network has a state of resonance at one or the other frequency of a pair of frequencies assigned to it. Each pair of frequencies differ from one another and from the frequencies of the other pairs, there being a first frequency of each pair corresponding to one state of each device and a second frequency of each pair corresponding to another state of the device.

Means are coupled to the resonant networks and responsive to the operation of the devices for conditioning each one of the resonant networks for operation in one or the other of its resonant frequency states. Where the devices comprise control valves in a subsea petroleum control system, for example, the conditioning means may comprise electrical switches having an open state when the valves are open and a closed state when the valves are closed, or vice versa.

A reference network is also provided which includes a plurality of resonant circuits equal in number to the resonant networks, and each one of the resonant circuits is assigned to a corresponding one of the resonant networks. Each resonant circuit has a resonant frequency that is between the two different frequencies of the pair in a resonant network.

Means, such as a sweep frequency oscillator, is provided for applying to the encoder and reference network a signal train of frequencies whose spectrum extends from a frequency below the lowest frequency assigned to the resonant networks to a frequency above the highest frequency assigned to the resonant networks. A first signal output is thereby developed from the encoder which includes a plurality of resonance points corresponding respectively to the states of resonance of the networks thereof, and a second signal output is developed from the reference network which includes a plurality of resonance points corresponding respectively to the resonance frequencies of the reference network.

Phase comparator means are provided for comparing the relative phase of the first and second signal outputs to determine the relative occurrences of the resonance points of the encoder and reference network. The signals resulting from the phase comparison are then fed to a data register to provide digital output data based upon the results of the comparison and which give an indication of the states of the different devices.

DESCRIPTION OF THE PREFERRED EMBODIMENT

Figure 1:
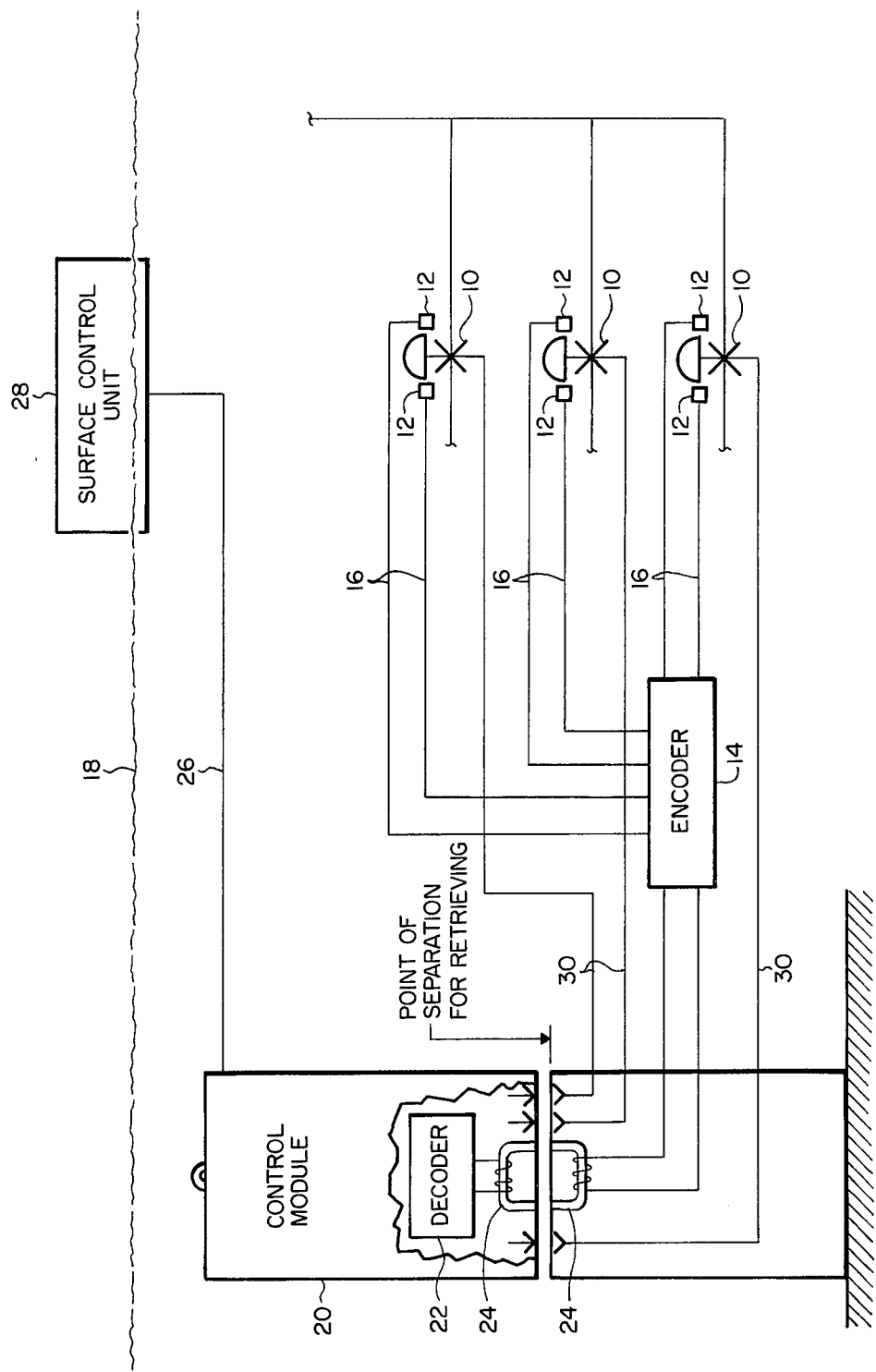
FIG. 1 is a diagrammatic view of a subsea petroleum well control system incorporating a passive encoder and an electrohydraulic control module including an active decoder in accordance with the invention.

Referring now to FIG. 1, a subsea petroleum well control system is shown by way of example which includes a plurality of bistable devices or control valves 10, which may be hydraulically operated, and which are used to control various functions of an oil/gas well.

Associated with the control valves 10 are switches 12 which may be used to indicate the condition, or state, open or closed, of the valves 10. The switches 12 are interconnected with a passive encoder 14 by means of conductors 16.

The encoder 14, along with the valves 10 and switches 12 are normally part of a well head assembly which may be located at the bottom of the ocean to depths of hundreds or thousands of feet beneath the ocean surface, such as shown at 18.

Also shown is a retrievable control module 20, also submerged, which includes an active decoder 22. The decoder 22 is electrically coupled to the encoder 14 by means of inductive coupler 24. Data concerning the status of the switches 12 transferred from the encoder 14 to the decoder 22 may be transmitted by conventional means, such as a cable 26, to a surface control unit 28 located on a platform above the water surface 18 or at a shore station. An operator located at the surface control unit 28 may, by means of commands transmitted through the cable 26 to the control module 20 and thence through interconnections 30, which may be hydraulic or electrical, cause the valves 10 to operate. The data concerning the status of the valves 10, as indicated by the switches 12, transmitted to the surface control unit 28 as previously described, confirms the operation initiated by the operator.

Figure 2:
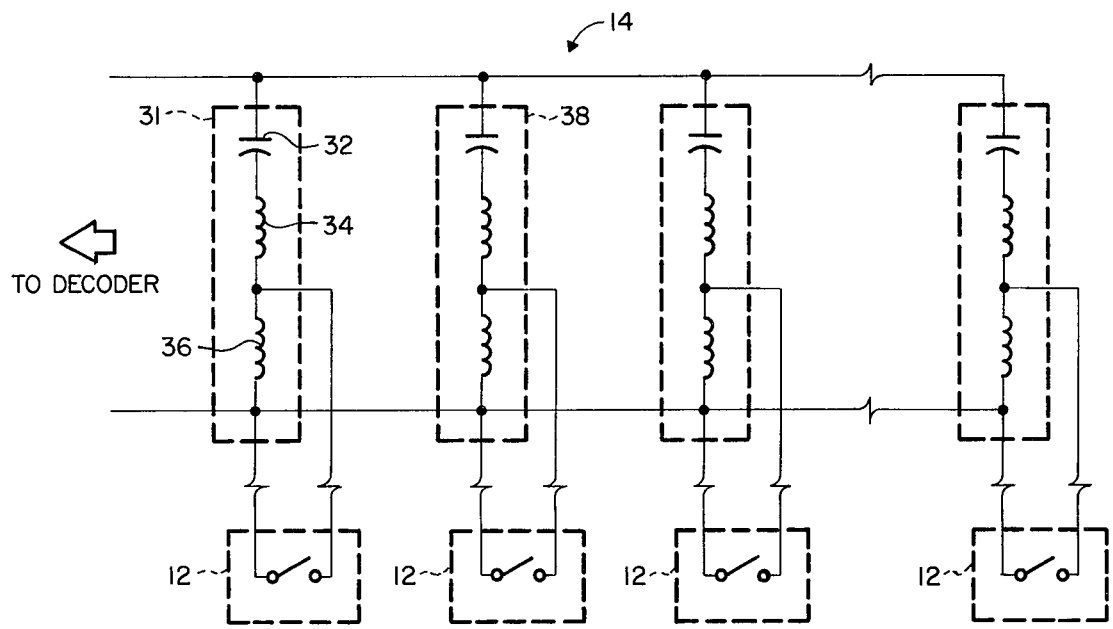
FIG. 2 is a schematic diagram of one form of the passive encoder illustrated in FIG. 1.

FIG. 2 is a schematic diagram of one form of passive encoder network arranged and capable of operating according to the principles of the invention. The encoder 14 includes a plurality of parallel connected, series resonant networks, each of which is resonant at a different frequency. A first network 31 resonant at the lowest operating frequency, includes a capacitor 32, a first inductor 34, and a second inductor 36. The second inductor 36 is connected in parallel with one of the switches 12 so that when a particular valve 10 associated with that switch is in a given condition as defined by the system requirements, the switch shorts out the second inductor 36.

The resonant frequency of each network is defined by the well known fundamental equation relating the resonant frequency $f_o$ to the inductance L and capacitance C, which is $f_o = 1/(2\pi \sqrt{LC})$. Thus, when the switch 12 of the first network 31 is open, the inductance L of the first network is equal to the sum of the individual inductances of the inductors 34 and 36. When the switch 12 of the first network 31 is closed, inductor 36 is shorted out and the inductance L of the first network is only that of the first inductor 34. With a fixed value of capacitance C, determined by the capacitor 32, the resonant frequency $f_o$ of the first network 31 with the switch 12 open is lower than that frequency $f_o'$ which is obtained when the switch 12 is closed. Thus, by ascertaining the resonant frequency $f_o$ of the resonant network 31, the condition of the switch 12, whether open or closed, and the condition of its associated valve 10, can be determined.

Likewise, a second resonant network 38 with different values of inductance and capacitance and hence different resonant frequency $f_o$ can convey like information concerning the status of a different switch 12 and its associated valve 10. Similarly, the remaining resonant networks, one for each of the other switches 12, have still different values of inductance L, capacitance C, and resonant frequency $f_o$, and can convey similar information concerning the status of the remaining switches 12 and associated valves 10.

Figure 3:
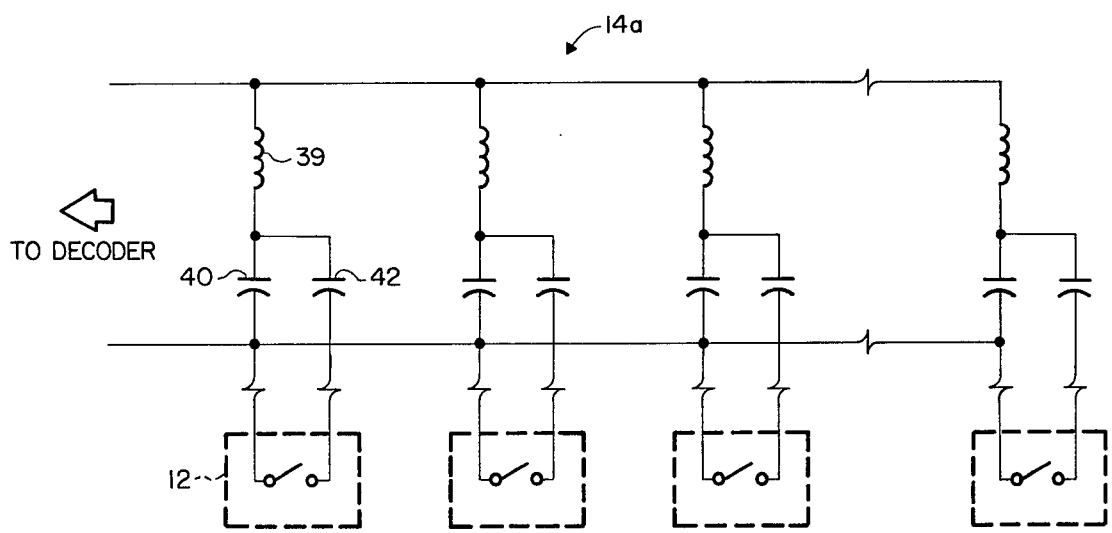
FIG. 3 is a schematic diagram of another form of passive encoder.

FIG. 3 shows an alternate form of encoder 14a which is similar to the encoder 14 of FIG. 2 described above except that each series resonant network comprises a single inductor 39 in series with an arrangement including a first capacitor 40 in parallel with a second capacitor 42 in series with one of the switches 12. When the switch 12 is closed, the total value of the capacitance in the series resonant network is the value of a single capacitor 40, and when the switch 12 is closed, the capacitance value is increased to equal the sum of the capacitance of the two capacitors 40 and 42. Therefore, when the switch 12 is open, the resonant frequency $f_o$ is higher than when the switch 12 is closed. Although the operation of the switch 12 gives an indication which is opposite that described with reference to FIG. 2, the information is still present and retrievable by similar means.

The function of the encoder 14 or 14a is to convert the binary data represented by the switch 12 into frequency information in accordance with the principles discussed above. It is now necessary to retrieve the digital information represented by the encoder circuitry. Briefly, this may be done as follows.

Digital information concerning the status of the switch 12 is converted to frequency information in the passive encoder 14 as described previously. This frequency information is retrieved by the decoder 22 by applying a swept spectrum of frequencies to the encoder circuitry and monitoring the relative phase of the current with respect to the applied voltage. As the frequency sweeps through a point of series resonance, the phase of the current changes from leading to lagging, going through zero phase difference at the unique resonant frequency. This change of phase through zero is easily detected by a phase comparator. This phase change defines points in the sweep which represent the series resonances of each of the individual networks of the encoder 14.

By comparing these points of resonance with those of a reference network adjusted to resonance frequency between the two possible discrete frequencies of each network of the encoder 14, it can be determined whether the resonance of the encoder network occurs before or after the reference resonance for a given network. This indicates whether the encoder network is resonant at the low or the high frequency as determined by the condition of the switch, whether open or closed, as explained previously in connection with the operation of the encoder. Knowing how the switches were originally configured for a given control valve, the condition of the valve as represented by the switch is therefore known.

Figure 4:
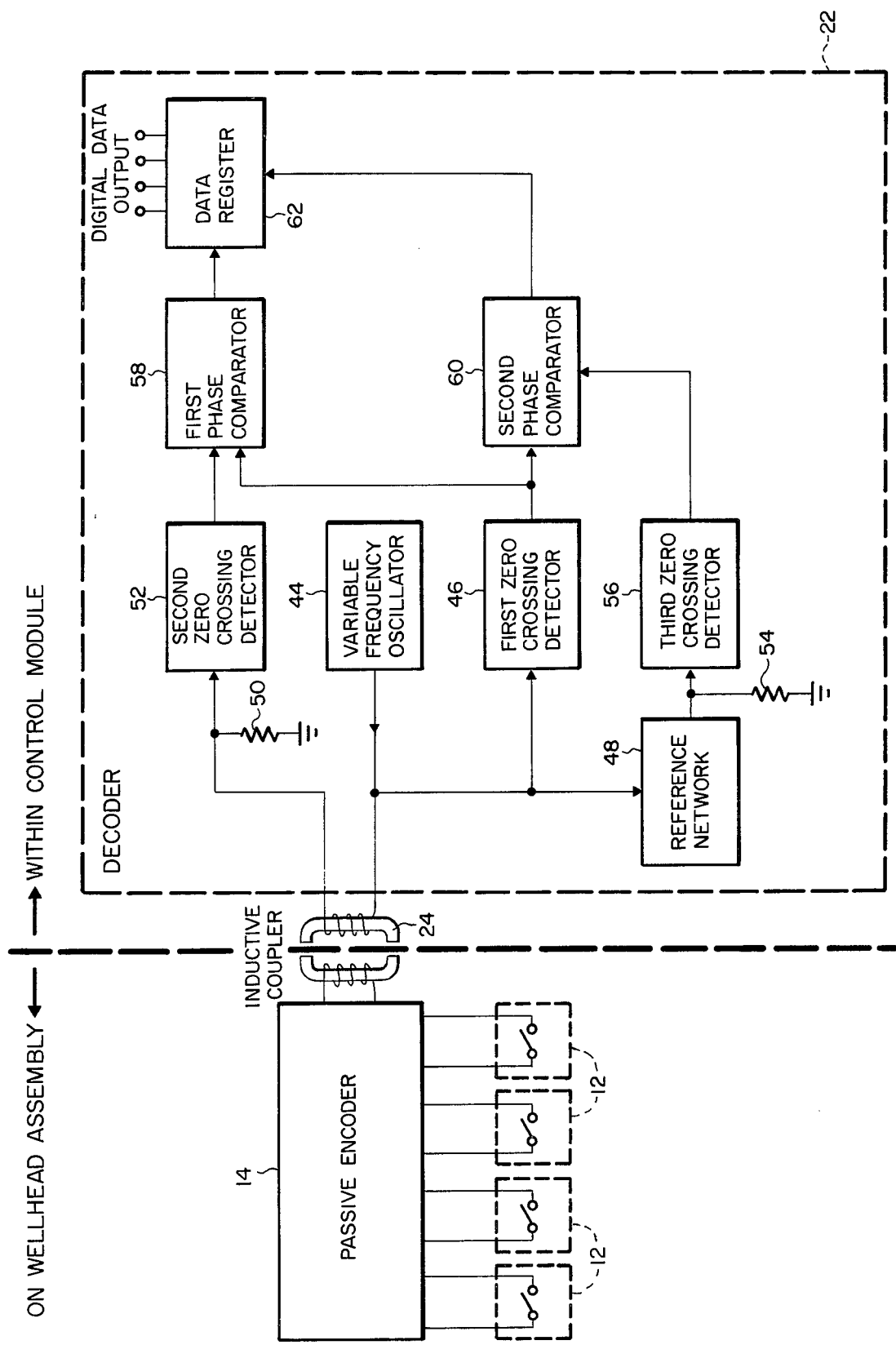
FIG. 4 is a block diagram showing the interconnection of the passive encoder with the active decoder of FIG. 1.

FIG. 4 is a block diagram illustrating the operation by which the digital information represented by the switches 12 is retrieved. The passive encoder 14 may be coupled electrically to the decoder 22 by means of the inductive coupler 24. A variable frequency oscillator 44 sweeps from a frequency below the lowest resonance frequency of the encoder 14 to a frequency above its highest resonance frequency. This sinusoidal variable frequency signal is fed to a first zero crossing detector 46 which converts that signal into a square wave of identical phase which is compatible with digital logic circuitry.

The sinusoidal signal from the oscillator 44 is also fed to the passive encoder 14 and to a reference network 48. The reference network 48 comprises a plurality of series resonant networks equal in number and similar to those of the encoder 14. Each series resonant network of the reference network 48 corresponds to a series resonant network of the encoder 14 and has a single resonance frequency that is between the two resonance frequencies associated with its corresponding series resonant network in the encoder 14.

The sinusoidal waveform fed to the passive encoder 14 has a current associated with it whose phase is a function of the frequency applied to the passive encoder 14. The inductive coupler 24 transfers this phase information from the encoder 14 to the decoder 22 with minimal distortion. The current circulates through a first resistor 50 which generates a sinusoidal voltage waveform having the phase characteristic of the current. This voltage waveform is fed to a second zero crossing detector 52 which converts the waveform to a square wave compatible with digital logic.

Similarly a current resulting from the sinusoidal voltage fed to the reference network 48 from the oscillator 44 flows through a second resistor 54 and generates a sinusoidal voltage waveform. This voltage waveform is fed to a third zero crossing detector 56 where it is converted to a square wave compatible with digital logic.

The output of the first zero crossing detector 46 is compared in a first phase comparator 58 with the output of the second zero crossing detector 52. The output of the first phase comparator 58 indicates at which point in time the swept frequency coincides with a condition of resonance in the passive encoder 14.

Similarly the output of the third zero crossing detector 56 is compared with the output of the first zero crossing detector 46 in a second phase comparator 60. The output of the second phase comparator 60 indicates at which point in time the swept frequency coincides with a condition of resonance in the reference network 48.

The output signal of the second phase comparator 60 is fed as a clocking signal to a data register 62 which gates the then present output signal of the first phase comparator 58 into storage. The output signal of the first comparator 58 would already be present if the network under scrutiny were resonant at the lower of its two frequencies. Otherwise, the output signal would not be present at that time for the high frequency condition. Therefore, the condition of the first phase comparator 58 at that instant would effectively be the status of the particular switch 12 under scrutiny.

Figure 5:
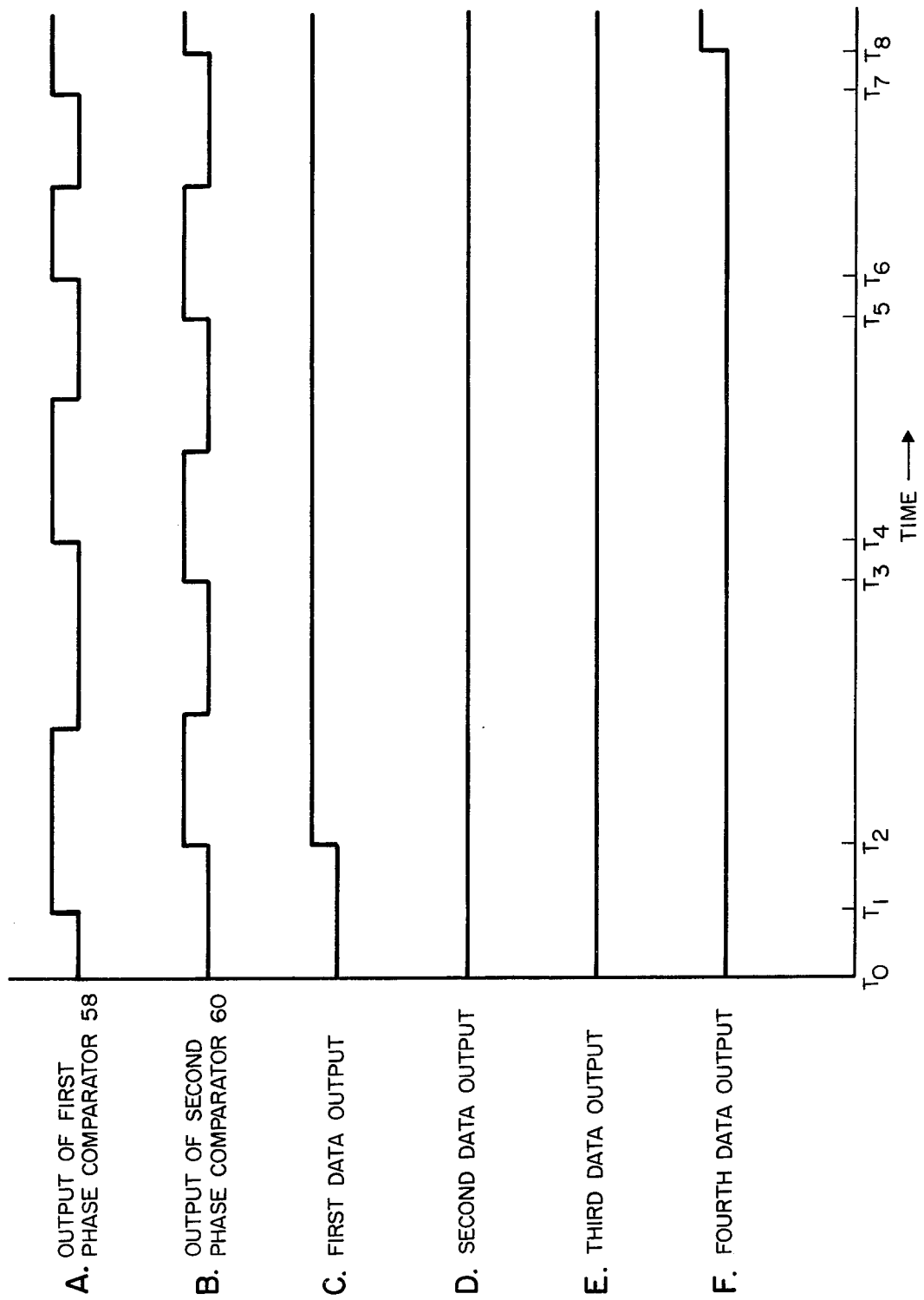
FIG. 5 is a timing waveform diagram showing the output of phase comparator and data register apparatus shown in FIG. 4.

FIG. 5 is a timing waveform diagram showing the output of the first phase comparator 58 and the second phase comparator 60 as well as the data outputs of the data register 62 for a typical combination of switches 12.

At time $T_o$ the sweep of the frequency spectrum is started. At time $T_1$ the output of the first phase comparator 58, as shown in trace A, is present before time $T_2$, the time when an output occurs from the second phase comparator 60 and the time when the reference series resonant circuit for the first network is crossed, as shown in trace B. At that time $T_2$, the data register 62 is clocked to store the data pertaining to the first switch 12, shown in trace C as a binary one or a change in state occurring at time $T_2$. The fact that the output of the first phase comparator 58 occurred prior to the output of the second phase comparator 60 indicates that the appropriate network of the encoder 14 was resonant at a lower frequency than that of the reference network 48. This would occur only if the switch 12 were open in the case of an encoder 14 of the form shown in FIG. 2 or if the switch 12 were closed in the case of an encoder 14a of the form shown in FIG. 3.

At time $T_3$ the frequency of the reference resonant circuit corresponding to the second network of the encoder 14 coincides with the frequency of the swept oscillator 48 and causes the output of the first phase comparator 58 to be stored in the data register 62 as the second data output, shown in trace D as a binary zero. The output of the first phase comparator 58 did not occur until a time $T_4$, after that of the second comparator 60, indicating that the second resonant network of the encoder was resonant at a higher frequency than the second resonant circuit of the reference network 48. This indicates a closed switch 12 for an encoder of the form shown in FIG. 2 or an open switch for one of the form in FIG. 3.

Similarly, at time $T_5$ an output from the second phase comparator 60 occurs before an output occurs from the first phase comparator 58 at time $T_6$. This indicates that the third resonant network of the encoder 14 was resonant at a higher frequency than the third resonant circuit of the reference network 48. Thus, the third data output, shown in trace E as a binary zero or no change in state occurring at time $T_5$ indicates that a third switch 12 is in the closed condition for an encoder 14 of the type shown in FIG. 2 or that the switch is in the open condition for an encoder 14a of the type shown in FIG. 3.

At times $T_7$ and $T_8$ the conditions that obtain are the same as those that occurred at time $T_1$ and $T_2$, namely an output occurring from the first phase comparator 58 prior to an output from the second phase comparator 60. In trace F, the fourth data output is shown as a binary one or change in state occurring at time $T_8$. Thus the fourth switch is in the same condition as the first switch.

At a time after all of the networks have been scanned, the sweep frequency oscillator 44 resets and starts again at time $T_o$ and repeats itself.

Figure 6:
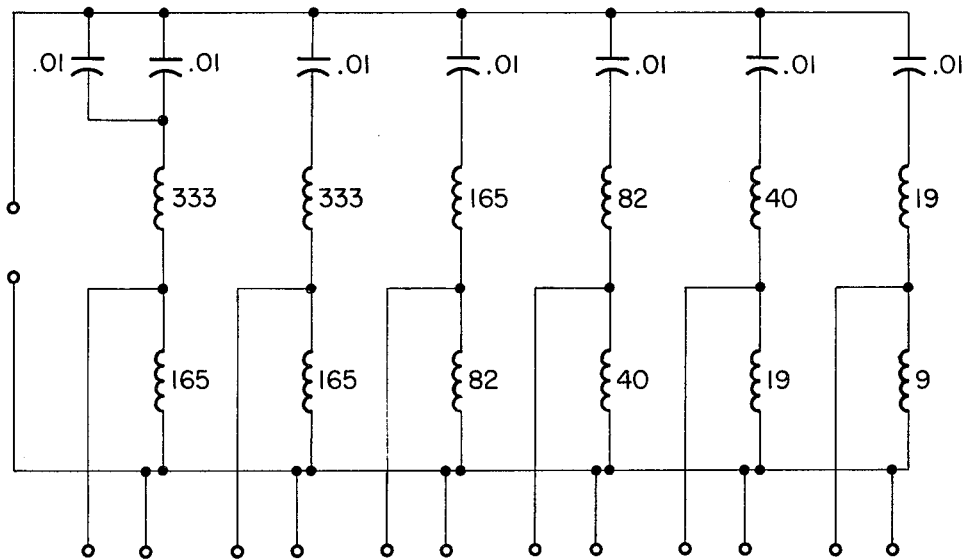
FIGS. 6 and 7 are schematic diagrams of, respectively, an encoder and a reference network showing typical values of inductances and capacitances which may be used in those circuits.
Figure 7:
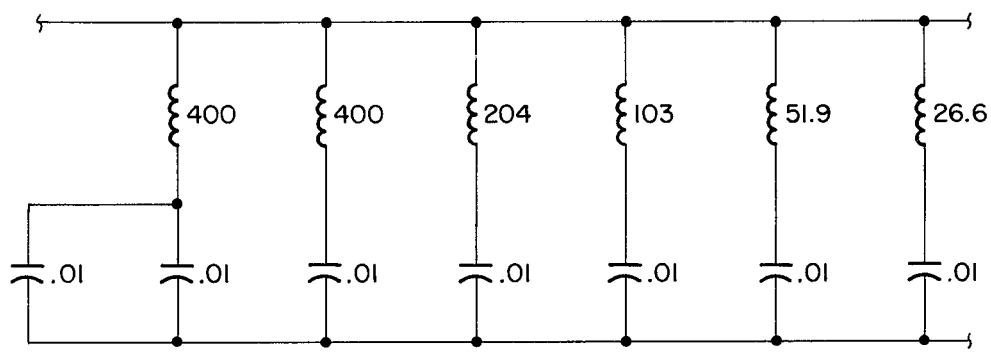

Typical circuit component values for an encoder and a reference network are shown in FIGS. 6 and 7 respectively. The capacitor values are in microfarads and the inductor values are in millihenries. For use in conjunction with an encoder and reference network having the illustrated circuit component values, a sweep frequency oscillator operating within the frequency range between 1,000 Hz and 12,000 Hz may be used.

According to the circuit values given in FIG. 6, the resonant frequencies in the resonant networks differ approximately by a factor of $\sqrt{2}$. That is, the resonant frequency $f_o$ of the second resonant network is $\sqrt{2}$ times that of first resonant network, the resonant frequency $f_o$ of the third resonant network is $\sqrt{2}$ times that of the second resonant network, and so on. However, the high and low resonant frequencies $f_o'$ and $f_o$ of each resonant network differ by a much smaller factor.

It should be readily apparent that various modifications may be made without departing from the scope of the invention. For example, the encoder may include a single capacitor in series with a single inductor, and the switch may be connected to short out either the capacitor or the inductor. With the switch open, the resonant frequency of a given network would be lower than the reference frequency counterpart, and when the switch is closed, the resonant frequency would be a much higher frequency which is determined in part by the amount of stray capacitance and inductance in series with the inductor or the capacitor not shorted out. Such high resonant frequency need not be scanned by the sweep frequency oscillator. That is, the oscillator may scan to cover a spectrum from below the lowest frequency of the encoder to above the highest frequency of the reference network. The apparatus previously described would still be able to detect a first state as being established when a zero crossing in the encoder occurred prior to a zero crossing in the reference network, and also would establish that if no zero crossing occurred in the encoder prior to a zero crossing in the reference network, because the frequency was too high to give a zero crossing, then the second state would have been established.

The principal advantages of this circuit are that multiple bits of status information can be transferred using only a single pair of conductors and that no external power is required to encode this data. Further, the fact that no active components are used increases the reliability and simplicity of the encoder circuit. Components are also available for the encoder which are virtually unaffected by pressure and are usable to extreme depths without resorting to a pressure vessel type enclosure.

What is claimed is:

1. A method of determining the respective states of a plurality of devices having at least two stable states, comprising:
   a. assigning a pair of different frequencies to each one of said devices, each pair of frequencies differing in frequency from each other and from the other pairs, there being a first frequency of each pair corresponding to one state of each of said devices and a second frequency of said pair corresponding to another state of said device;
   b. generating a signal train of frequencies whose spectrum extends from a frequency below the lowest frequency assigned to said devices to a frequency above the highest frequency assigned to said devices;
   c. applying said signal train to an encoder including a plurality of resonant networks equal in number to said devices and each of which has a state of resonance at one or the other frequency of said pair of frequencies assigned to said devices depending upon the state of said device;
   d. providing means coupled to said resonant networks and responsive to the operation of said devices for conditioning each one of said resonant networks for operation in one or the other of its resonant frequency states whereby upon application of said signal train to said resonant networks, a first signal output is obtaining including a plurality of resonance points corresponding respectively to the condition of resonance of said networks;
   e. applying said signal train to a reference network including a plurality of resonant circuits equal in number to said resonant networks, each of said reference resonant circuits being assigned to a corresponding one of said resonant networks of said plurality and having a resonance frequency that is between the two different frequencies of said pair, whereby to obtain a second signal output including a plurality of resonance points corresponding respectively to the resonant frequencies of said reference network;
   f. comparing the relative phase of said first and second signal outputs to determine the relative occurrences of the resonance points of said encoder resonant networks and said reference resonant circuits; and
   g. deriving a digital output based upon the results of the comparison made in (f).

2. The invention according to claim 1 and further including making a first phase comparison between the zero crossings of said signal train and the zero crossings of the output from said encoder, and making a second comparison between the zero crossings of said signal train and the zero crossings of the output from said reference network.

3. The invention according to claim 2 and further including deriving a first signal indicative of the points of coincidence between the two sets of zero crossings of said first phase comparison, deriving a second signal indicative of the points of coincidence between the two sets of zero crossings of said second phase comparison, and using the second signal as a clocking signal to gate the first signal into storage.

4. The invention according to claim 1 wherein the resonant networks of said encoder and the resonant circuits of said reference network are series resonant.

5. The invention according to claim 1 wherein the frequency difference between a resonant frequency of one resonant network and the next higher frequency of a second resonant network is greater than the frequency difference between each pair of frequencies of an individual resonant network.

6. Apparatus for determining the respective states of a plurality of devices having at least two stable states, comprising:
   a. a passive encoder including a plurality of resonant networks equal in number to said devices and each network of which has a state of resonance at one or the other frequency of a pair of frequencies assigned to it, each pair of frequencies differing from each other and from the frequencies of the other pairs, there being a first frequency of each pair corresponding to one state of each device and a second frequency of each pair corresponding to another state of said device;
   b. means coupled to said resonant networks and responsive to the operation of said devices for conditioning each one of said resonant networks for operation in one or the other of its resonant frequency states;
   c. a reference network including a plurality of resonant circuits equal in number to said resonant networks and each of which is assigned to a corresponding one of said resonant networks of said plurality, each resonant circuit having a resonance frequency that is between the two different frequencies of the pair in a resonant network;
   d. means for generating and applying to said encoder and to said reference network a signal train of frequencies whose spectrum extends from a frequency below the lowest frequency assigned to said resonant networks to a frequency above the highest frequency assigned to said resonant networks, thereby to develop a first signal output from said encoder which includes a plurality of resonance points corresponding respectively to the states of resonance of said networks, and to develop a second signal output which includes a plurality of resonance points corresponding respctively to the resonant frequencies of said reference network;
   e. means for comparing the relative phase of said first and second signal outputs to determine the relative occurrences of the resonance points of said encoder and said reference network; and
   f. means for deriving digital output data based upon the results of the comparison made by the means in (e).

7. The invention according to claim 6, wherein the means in (d) includes a sweep frequency oscillator.

8. The invention according to claim 7 and further including a first zero crossing detector coupled to the output of said sweep frequency oscillator, a second zero crossing detector coupled to the output of said encoder, and a third zero crossing detector coupled to the output of said reference network.

9. The invention according to claim 8 and further including a first phase comparator for comparing the outputs from said first and second zero crossing detectors and a second phase comparator for comparing the outputs from said first and third zero crossing detectors.

10. The invention according to claim 9 and further including a data register coupled to the outputs of said first and second phase detectors for providing a plurality of digital data outputs each of which indicates whether an output signal from said first phase comparator occurs prior to or subsequent to a corresponding output signal from said second phase comparator.

11. Apparatus for determining the respective states of a plurality of devices having at least two stable states, comprising:
 a. a reference network including a plurality of resonant circuits equal in number to said devices and each circuit of which has a resonant frequency that differs from those of the other circuits;
 b. a passive encoder including a plurality of resonant networks equal in number to said resonant circuits and each of which is assigned to a corresponding one of said devices and to a corresponding one of said resonant circuits of said plurality, each of said resonant networks having a first resonant frequency, corresponding to one state of said assigned device, that is below the resonant frequency of its corresponding resonant circuit and also having a second resonant frequency, corresponding to another state of said assigned device, that is above the resonant frequency of its corresponding resonant circuit;
 c. means coupled to said resonant networks and responsive to the operation of said devices for conditioning each one of said resonant networks for operation in one or the other of its resonant frequency states;
 d. means for generating and applying to said reference network and said encoder a signal train of frequencies whose spectrum extends from a frequency below the lowest frequency assigned to said resonant networks to a frequency above the highest frequency assigned to said resonant circuits, thereby to develop a first signal output from said reference network that includes a plurality of resonance points corresponding respectively to the resonant frequencies of said resonant circuits, and to develop a second signal output from said encoder that includes a plurality of resonance points corresponding respectively to the lower one at least of the two resonant frequencies of said resonant networks;
 e. means for comparing the relative phase of said first and second signal outputs to determine the relative occurrences of the resonance points of said reference networks and said encoder; and
 f. means for deriving digital output data based upon the results of the comparison made by the means in (e).

12. The invention according to claim 11 wherein the resonant circuits of said reference network and the resonant networks of said encoder are series resonant.

13. The invention according to claim 11 wherein said encoder comprises a plurality of parallel connected networks, and each network includes, in series, a capacitor, a first inductor, and a second inductor, and means operatively associated with said devices to short out one of said inductors when a corresponding device is in one of its two stable states.

14. The invention according to claim 11, wherein said encoder comprises a plurality of parallel connected networks, and each network includes, in series, a first inductor and a first capacitor, and means operatively associated with said devices to add a second capacitor in parallel with said first capacitor when a corresponding device is in one of its two stable states.

* * * * *